US012637002B1

(12) United States Patent
Kaneko et al.

(10) Patent No.: US 12,637,002 B1
(45) Date of Patent: May 26, 2026

(54) VEHICLE SYSTEM AND VEHICLE CONTROL METHOD

(71) Applicant: TOYOTA JIDOSHA KABUSHIKI KAISHA, Toyota (JP)

(72) Inventors: Tomohiko Kaneko, Yokohama (JP); Junichi Morimura; Shun Maruyama, Numazu (JP); Ryoma Hiraike, Toyota (JP); Satoshi Omi, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 107 days.

(21) Appl. No.: 18/616,595

(22) Filed: Mar. 26, 2024

(30) Foreign Application Priority Data

May 17, 2023 (JP) ................................. 2023-081422

(51) Int. Cl.
*B60Q 9/00* (2006.01)

(52) U.S. Cl.
CPC .................................... *B60Q 9/008* (2013.01)

(58) Field of Classification Search
None
See application file for complete search history.

(56) References Cited

U.S. PATENT DOCUMENTS

| | | | | |
|---|---|---|---|---|
| 8,606,430 B2 * | 12/2013 | Seder | ...................... | B60Q 1/50 |
| | | | | 701/2 |
| 10,946,791 B2 * | 3/2021 | Morimura | .............. | B60Q 1/381 |
| 11,772,550 B2 * | 10/2023 | Oya | ....................... | B60Q 1/525 |
| | | | | 340/463 |
| 12,030,500 B2 * | 7/2024 | Kanoh | ............ | B60W 30/18163 |
| 2016/0214483 A1 * | 7/2016 | Kleen | ............... | B60W 60/0053 |
| 2016/0246298 A1 * | 8/2016 | Sato | ...................... | B60W 40/08 |
| 2017/0240098 A1 | 8/2017 | Sweeney et al. | | |
| 2018/0072218 A1 * | 3/2018 | Sweeney | ............... | B60Q 1/545 |
| 2018/0173237 A1 * | 6/2018 | Reiley | .................. | B60Q 1/5035 |
| 2019/0025825 A1 * | 1/2019 | Takahama | .............. | B60W 30/16 |
| 2019/0043362 A1 * | 2/2019 | Morimura | ................ | G06N 5/04 |
| 2019/0043363 A1 | 2/2019 | Morimura et al. | | |
| 2020/0231181 A1 * | 7/2020 | Miyahara | ............. | B62D 15/025 |
| 2021/0155246 A1 * | 5/2021 | Oh | .......................... | B60Q 9/008 |
| 2021/0188301 A1 * | 6/2021 | Oba | ....................... | G01C 21/36 |
| 2021/0379992 A1 * | 12/2021 | Domeyer | .............. | B60K 35/60 |
| 2021/0394793 A1 * | 12/2021 | Austin | ................... | G06V 40/18 |
| 2022/0366790 A1 * | 11/2022 | Okamura | ............. | G08G 1/0133 |

(Continued)

FOREIGN PATENT DOCUMENTS

| | | |
|---|---|---|
| JP | 2013-120574 A | 6/2013 |
| JP | 2019-26201 A | 2/2019 |

(Continued)

*Primary Examiner* — Muhammad Adnan
(74) *Attorney, Agent, or Firm* — Oblon, McClelland, Maier & Neustadt, L.L.P.

(57) ABSTRACT

A vehicle system and vehicle control method enabling notifications to be made for smoothing traffic involving a host vehicle, that is, a vehicle system having a processor for judging a running state of a host vehicle, wherein in case of the processor judges that a second running state in which the host vehicle will change in behavior compared with a first running state in which the host vehicle or other vehicles present in the surroundings of the host vehicle are currently running will occur due to a predetermined reason, alerts the outside of the alert content including the predetermined reason.

12 Claims, 5 Drawing Sheets

(56)        References Cited

U.S. PATENT DOCUMENTS

| | | | |
|---|---|---|---|
| 2022/0396205 A1* | 12/2022 | Rodrigues | B60R 1/23 |
| 2023/0001948 A1* | 1/2023 | Hayashi | B60W 40/08 |
| 2023/0182747 A1* | 6/2023 | Kobayashi | B60W 60/0059 |
| | | | 701/1 |
| 2024/0116529 A1* | 4/2024 | Kume | B60W 60/0053 |
| 2024/0395143 A1* | 11/2024 | Kaneko | B60Q 9/00 |
| 2024/0409112 A1* | 12/2024 | Fayad | B60W 30/18163 |
| 2025/0126508 A1* | 4/2025 | Zhong | H04W 36/0011 |

FOREIGN PATENT DOCUMENTS

| | | | |
|---|---|---|---|
| JP | 2019-515822 A | 6/2019 | |
| JP | 2021-108073 A | 7/2021 | |
| JP | 2022-018474 A | 1/2022 | |
| JP | 2015-228152 A | 12/2025 | |
| WO | 2007/046269 A1 | 4/2007 | |

* cited by examiner

VEHICLE SYSTEM AND VEHICLE CONTROL METHOD

FIELD

The present disclosure relates to a vehicle system and vehicle control method for alerting the surroundings of a host vehicle of information relating to running.

BACKGROUND

A conventional manual driving vehicle displayed the intent of a host vehicle to other vehicles by winkers and other lights provided at the vehicle and displayed intent to other vehicles jointly using hand signals of the driver. In recent years, automated driving vehicles able to autonomously run on roads have been studied.

For example, PTL 1 (Japanese Unexamined Patent Publication No. 2019-515822) discloses an intent notifying system for an automated driving vehicle to notify its intent to traffic participants in its surroundings. According to the art described in PTL 1, in case of an automated driving vehicle engages in autonomous action such as a lane change, the fact that such action is being taken can be notified to the surroundings by visual information.

SUMMARY

In the art described in PTL 1, sometimes the information notified was insufficient and vehicles driving in the surroundings could be adversely affected.

The present disclosure has as its object the provision of a vehicle system and vehicle control method enabling alerts for smoothing the traffic around a host vehicle.

One aspect of the present disclosure is a vehicle system having a processor for judging a running state of a host vehicle, wherein in case of the processor judges that a second running state in which the host vehicle will change in behavior compared with a first running state in which the host vehicle or other vehicles present in the surroundings of the host vehicle are currently running will occur due to a predetermined reason, alerts the outside of the alert content including the predetermined reason.

According to the present disclosure, it is possible to provide alerts for smoothing traffic around a host vehicle.

DESCRIPTION OF EMBODIMENT

Figure 1:
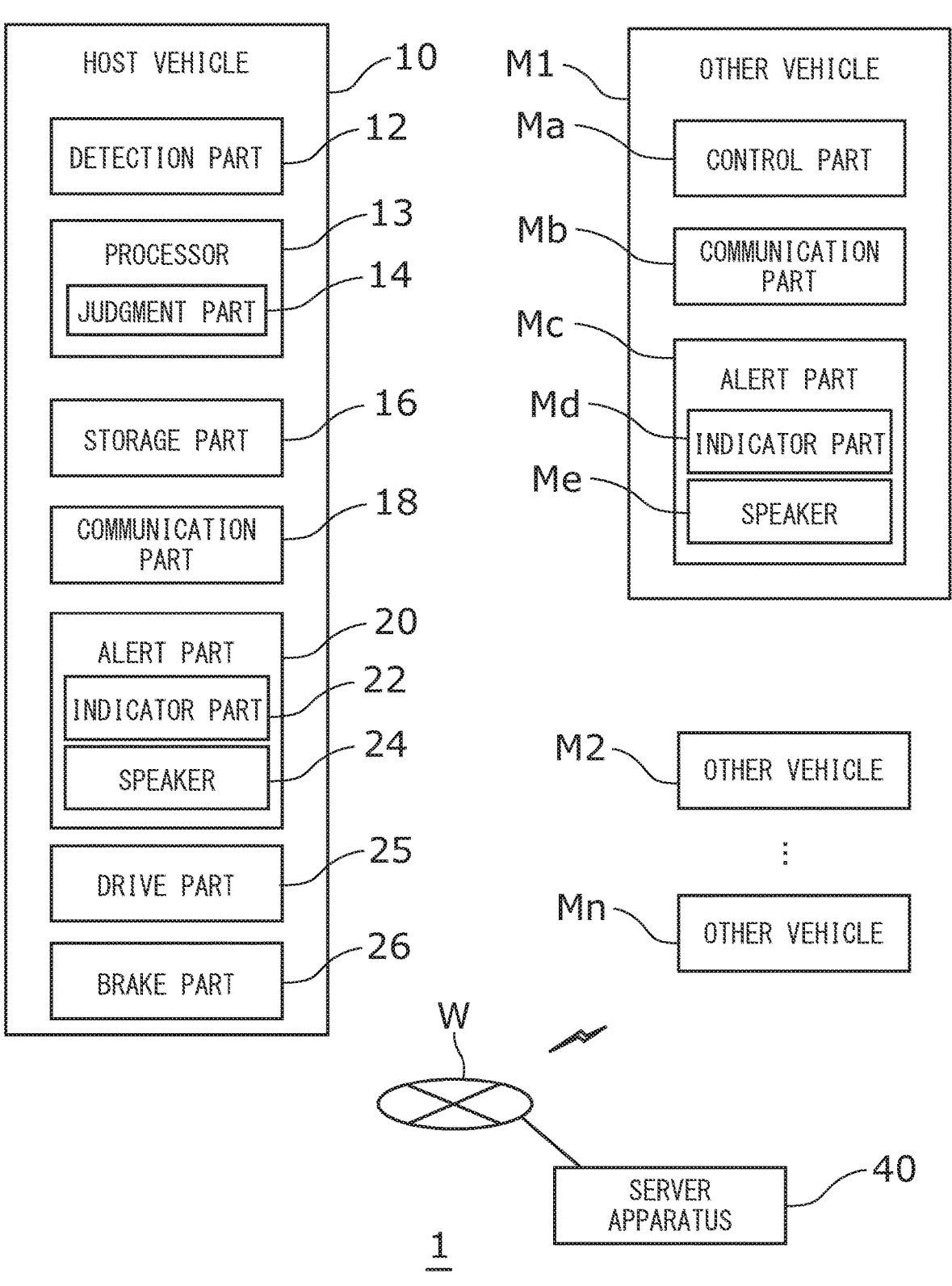
FIG. 1 is a block diagram showing the configuration of a vehicle system.

As shown in FIG. 1, a vehicle system 1 is comprised of a host vehicle 10, a plurality of other vehicles Mn (n: natural number), and a server apparatus 40 connected to a network W. The host vehicle 10 and the other vehicles Mn communicate through the network W. The host vehicle 10 and other vehicles Mn may also directly communicate by vehicle-tovehicle communication. The vehicle system 1 is configured to aid driving of the host vehicle 10 or other vehicles Mn and smooth traffic by communication of the host vehicle 10 and the plurality of other vehicles Mn.

The server apparatus 40 is configured so that if the host vehicle 10 or other vehicles Mn are automated driving vehicles, it communicates with the host vehicle 10 or other vehicles Mn through the network W to manage their running states.

The other vehicles Mn are for example automated driving vehicles. The other vehicles Mn may also be manual driving vehicles however. The other vehicles Mn are provided with controllers Ma for performing control relating to running or communication. The other vehicles Mn are also provided with communicators Mb able to communicate with the network W. The other vehicles Mn are further provided with alert devices Mc configured to alert information acquired through the communicators Mb. The communicators Mb are communication interfaces able to wirelessly communicate. The communicators Mb may also directly communicate with the host vehicle 10.

The alert devices Mc are for example comprised of indicators Md configured to display information by text or images or of speakers Me for providing information by voice. The indicators Md are comprised of liquid crystal displays able to display images etc.

The controllers Ma acquire information from the host vehicle 10 through the communicators Mb and make the alert devices Mc alert that information. The controllers Ma are comprised of processors for performing processing for making the alert devices Mc alert information. If the other vehicles Mn are automated driving vehicles, the controllers Ma may also perform control for making the other vehicles Mn autonomously run. In the other vehicle M1, the controller Ma, communicator Mb, and alert device Mc may also be comprised by a communication-ready mobile terminal which the driver operating the other vehicle Mn holds.

The host vehicle 10 is, for example, an automated driving vehicle which runs based on a predetermined automated driving level. The host vehicle 10 may also be a manual driving vehicle, however. The host vehicle 10 is provided with a detector 12 for detecting information relating to running of the host vehicle 10. The host vehicle 10 is also provided with a processor 13 for performing control relating to running of the host vehicle 10 based on the results of detection of the detector 12. The host vehicle 10 is further provided with a storage 16 configured to storage data and programs necessary for the processing of the processor 13 and data necessary for running of the host vehicle 10.

The host vehicle 10 is provided with a communicator 18 configured to communicate with the network W. The host vehicle 10 is also provided with an alert device 20 controlled by the processor 13 and configured to alert predetermined alert content to the outside. The host vehicle 10 is further provided with a driving device 25 controlled by the processor 13 configured to make the vehicle run and a braking device 26 necessary for braking.

The detector 12 acquires the running state of the host vehicle 10 and information on the surroundings of the host vehicle 10. The detector 12 is, for example, comprised of camera sensors, a lidar (light detection and ranging) sensor, position sensor, and other sensors. The detector 12 is configured to be able to detect objects by single sensors or combinations of sensors. The camera sensors capture the states of the surroundings of the host vehicle 10, including the road environment in which the host vehicle 10 is running and vehicles, pedestrians, and other traffic participants present in the surroundings of the host vehicle 10, and acquire the captured data.

The lidar sensor uses radar waves to scan the surroundings of the host vehicle 10 and acquire three-dimensional (3D) data of traffic participants such as other vehicles Mn, structures, obstacles, and other objects. The position sensor is, for example, provided with a GPS (global positioning system) sensor and acquires the current position data of the host vehicle 10 by communication with positioning satellites.

The detector 12 may also include other sensors besides the above so long as able to acquire the running state of the host vehicle 10 and information on the surroundings of the host vehicle 10. The detector 12 may also be provided with an input device configured to input of information relating to running of the host vehicle 10. The detector 12 may also acquire information relating to running of the host vehicle 10 from the server apparatus 40 through the communicator 18 and network W. The communicator 18 is comprised of a communication interface able to communicate wirelessly. The communicator 18 may also be configured to directly communicate with the other vehicles Mn.

The driving device 25 is, for example, configured by a drive power source or steering system required for running. The drive power source is comprised of an internal combustion engine, electric motor, hybrid system of an internal combustion engine and electric motor, etc. The steering system turns the wheels about an axle. The braking device 26 is comprised of a brake system required for braking. The driving device 25 and braking device 26 may be combined with a drive power source using an electric motor. The host vehicle 10 is provided with an electric power source (not shown) for supplying electric power to the different components. The electric power source used may be any one so long as able to supply electric power.

If the host vehicle 10 is an automated driving vehicle, the processor 13 controls the driving device 25 and braking device 26 based on the results of detection of the detector 12 to make the host vehicle 10 autonomously run. The processor 13 may also control the driving device 25 and braking device 26 based on the results of detection of the detector 12 to assist driving of the host vehicle 10.

The processor 13 has one or more CPUs (central processing units) and their peripheral circuits. The processor 13 may further have a processing circuit for performing logical operations or numerical operations. The processor 13 performs various processing based on a computer program stored in the storage 16. The processor 13 is provided with a judger 14 configured to judge the running state of the host vehicle 10 based on the results of detection of the detector 12. The storage 16 is comprised of a hard disk drive, flash memory, or other storage medium for storing data.

The alert device 20 is, for example, comprised of indicators 22 for displaying information by text or images or a speaker 24 (voice output device) for providing information by voice. The indicators 22 are provided at predetermined positions of the host vehicle 10 and display alert content to the outside. The indicators 22 are comprised of liquid crystal displays or other display devices able to display images. The indicators 22 may also jointly use projection devices for projecting images on the road surface. The alert device 20 is controlled by the judger 14 and alerts the outside of information relating to the host vehicle 10 based on the results of judgment.

Figure 2:
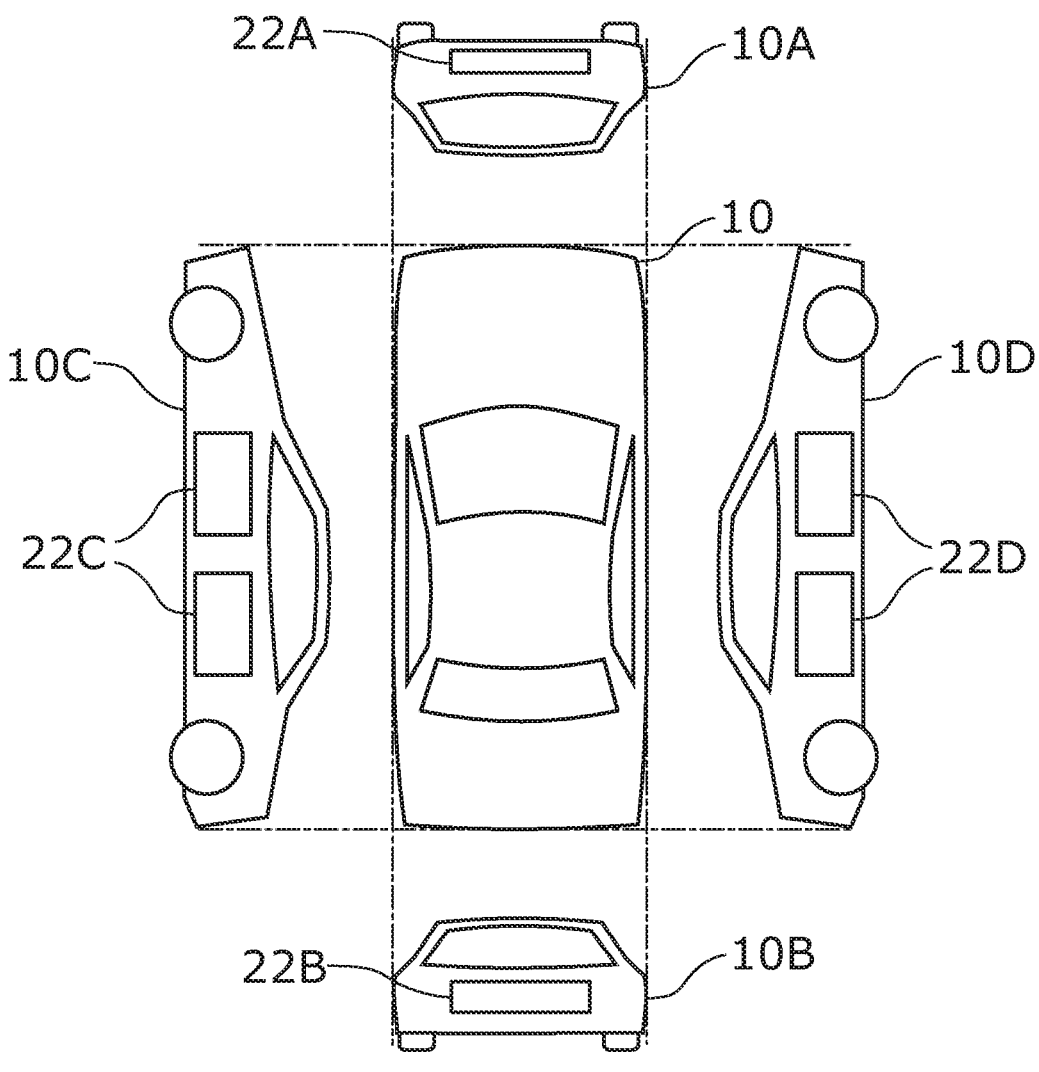
FIG. 2 is a view showing positions of indicators provided at a host vehicle.

As shown in FIG. 2, the indicators 22 are, for example, comprised of a plurality of display devices. The plurality of display devices is provided at different positions in the host vehicle 10 able to be seen from the outside. A front surface 10A side of the host vehicle 10 is provided with a first indicator 22A able to be seen in case of looking toward the front surface 10A of the host vehicle 10. The first indicator 22A is provided at the front surface of the host vehicle 10. The first indicator 22A may also be provided at a predetermined position inside the vehicle able to be seen from the outside through the front window.

A rear surface 10B side of the host vehicle 10 is provided with a second indicator 22B able to be seen in case of looking toward the rear surface 10B of the host vehicle 10. The second indicator 22B is provided at the rear surface of the host vehicle 10. The second indicator 22B may also be provided at a predetermined position inside the vehicle able to be seen from the outside through the rear window. A left surface 10C side of the host vehicle 10 is provided with a third indicator 22C able to be seen in case of looking toward the left surface 10C of the host vehicle 10. The third indicator 22C may be divided corresponding to the number of doors provided at the left surface 10C of the host vehicle 10.

A right surface 10D side of the host vehicle 10 is provided with a fourth indicator 22D able to be seen in case of looking toward the right surface 10D of the host vehicle 10. The fourth indicator 22D may be divided corresponding to the number of doors provided at the right surface 10D of the host vehicle 10. The numbers and positions of the devices of the indicators 22 explained above are just an example. The indicators 22 may include a different number of devices so long as able to be seen from the outside of the host vehicle 10. These may also be arranged at different positions. The indicators 22 may be formed by devices of any shape and number corresponding to the type and shape of the host vehicle 10 and the installation positions on it.

The first indicator 22A, second indicator 22B, third indicator 22C, and fourth indicator 22D show information of the same content. The first indicator 22A, second indicator 22B, third indicator 22C, and fourth indicator 22D may also display information of different content corresponding to the installation positions able to be viewed from the other vehicles Mn.

The judger 14 judges the running state of the host vehicle 10. The judger 14, for example, recognizes the situation in the surroundings of the host vehicle 10 based on the imaging data captured by the camera sensors included in the detector 12. The judger 14 recognizes the shape of the running lane on which the host vehicle 10 is running, the presence of any traffic lights, the content of indications of the traffic lights, the presence of any signs, the contents of display of the signs, and other parts of the road environment at the current position based on the imaging data. The judger 14 judges other vehicles Mn, pedestrians, and other traffic participants and structures, obstacles, etc. present in the surroundings of the host vehicle 10 and generates current road environment information of the surroundings of the host vehicle 10 based on the three-dimensional data acquired by the lidar sensor included in the detector 12.

If the host vehicle 10 is in the middle of automated driving, the judger 14 refers to map data stored in the storage 16 based on a running plan generated by the processor 13 and the detected value of the current position of the position sensor to acquire road environment map information relating to the road environment of the surroundings of the host vehicle 10. The judger 14 may also compare the road environment information obtained by the detector 12 against the road environment map information obtained by the map data to enhance the road environment information.

The judger 14, for example, recognizes the road environment of the surroundings of the host vehicle 10 based on the results of detection of the detector 12 and judges whether a second running state in which the host vehicle will change in behavior compared with a first running state in which the host vehicle 10 or other vehicles Mn present in the surroundings of the host vehicle 10 are currently running in the road environment will occur within a predetermined time period due to a predetermined reason.

The "first running state" is, for example, a state in which the host vehicle 10 and other vehicles Mn present in the surroundings of the host vehicle 10 run forming a group based on a predetermined order. The first running state is, for example, a state in which the host vehicle 10 and other vehicles Mn run in a line maintaining a predetermined direction, predetermined speed, and predetermined lane or a state where they stop in a line in accordance with a traffic light or instructions of a sign.

The "second running state" is, for example, a running state in which the host vehicle 10 will change in behavior compared with the first running state in which the host vehicle 10 or other vehicles Mn are currently running. The second running state is, for example, a running state in which the host vehicle 10 will decelerate, stop, accelerate, change lanes, turn left or right, take evasive action, turn on lights, etc. in case of running in the first running state.

The second running state is a state in which the host vehicle 10 starts forward, moves backward, accelerates, changes lanes, takes evasive action, turns on lights, etc. in case of stopped in the first running state. The second running state is a running state in which, in case of shifting from the first running state, there is a possibility of the other vehicles Mn present in the surroundings of the host vehicle 10 being affected, such as their being made to decelerate, stop, accelerate, change lanes, turn left or right, take evasive action, etc.

The "predetermined reason", for example, occurs due to the road environment or the host vehicle 10 or other vehicles Mn. The road environment, for example, includes lanes, road structural objects, and other things related to road structures and things related to traffic participants utilizing the road, things related to traffic regulations and customs applied in the road and other factors affecting the running of the host vehicle 10 on the road. The judger 14 recognizes the road environment of the surroundings of the host vehicle 10 based on the results of detection of the detector 12 and judges whether the host vehicle 10 would run in a predetermined road environment.

The "predetermined road environment", for example, is a road environment in which, among the things related to road structure, the host vehicle 10 and the other vehicles Mn have to run while cooperating with each other such as at merging parts of lanes, branching parts, intersections, narrow roads, roads with obstacles on them, etc. If the judger 14 judges that the host vehicle 10 would run in a predetermined road environment, it recognizes the first running state in which the host vehicle 10 or other vehicles Mn are currently running based on the results of detection of the detector 12.

The judger 14 recognizes the position of the host vehicle 10 on the road and the relative positions of the other vehicles Mn with respect to the host vehicle 10. The judger 14 recognizes the first running state of the group comprised of the host vehicle 10 and the plurality of other vehicles Mn in the surroundings of the host vehicle 10 based on the results of detection of the positional relationship of the host vehicle

10 and other vehicles Mn on the road, running directions, speeds, acceleration, etc. The judger 14 judges whether a second running state in which the behavior of the host vehicle will change compared with the recognized first running state will occur within a predetermined time period due to a predetermined reason.

If the judger 14 judges that the running state of the host vehicle 10 will change from the first running state to a second running state within a predetermined time period in a predetermined road environment, it makes the alert device 20 notify alert content including the predetermined reason. The judger 14 makes the indicators 22 display alert content including first information relating to the predetermined reason. The judger 14 makes the speaker 24 notify alert content including the first information relating to the predetermined reason. The drivers of the other vehicles Mn present in the surroundings of the host vehicle 10 can acquire information relating to the behavior of the host vehicle 10 based on the alert content provided through the alert device 20.

Figure 3:
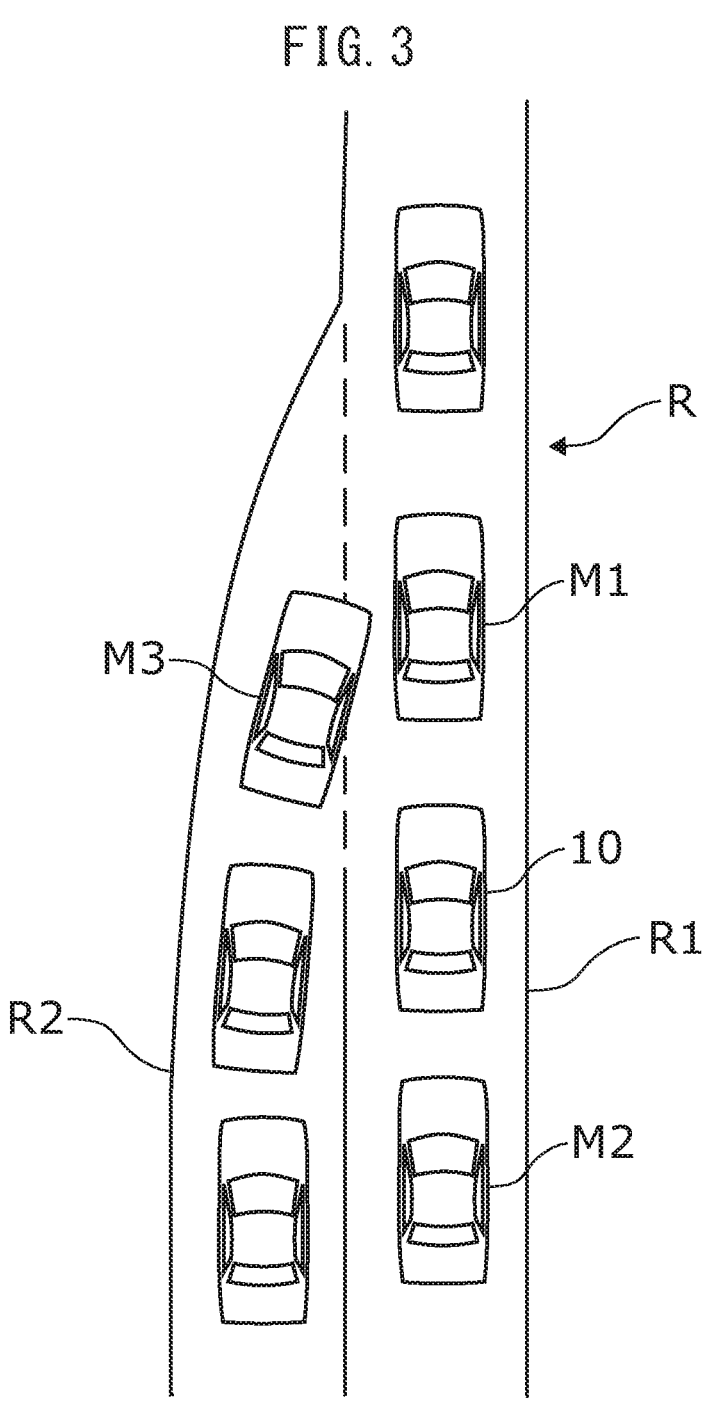
FIG. 3 is a view showing a host vehicle and other vehicles running at a merging part of a road.

FIG. 3 shows a merging part R of lanes as one example of a predetermined road environment. In the example of FIG. 3, the merging part R is configured so that a second lane R2 merges with a main first lane R1. The second lane R2 is, for example, configured so as to connect with the first lane R1 from the left side of the first lane R1. The judger 14 recognizes the road environment of the surroundings of the host vehicle 10 based on the results of detection of the detector 12 and judges that the host vehicle 10 would run in a predetermined road environment of the lane merging part R.

At the merging part R, desirably the vehicles running in the first lane R1 and the vehicles running in the second lane R2 run while cooperating with each other to merge with each other and thereby realize smooth traffic. If the judger 14 judges that the running state of the host vehicle 10 would change from the first running state to the second running state at the merging part R where the host vehicle 10 and other vehicles Mn run, it generates predetermined alert content and makes the alert device 20 notify them in order from the other vehicles Mn and the host vehicle 10 to cooperate.

The judger 14 judges which lane of the first lane R1 or the second lane R2 the host vehicle 10 is running on at the merging part R. In the example of FIG. 3, a state where the host vehicle 10 is running in the first lane R1 is shown. The judger 14 judges that the host vehicle 10 is running in the first lane R1 based on the results of detection of the detector 12. The judger 14 recognizes the other vehicles Mn running at the surroundings of the host vehicle 10 at the merging part R based on the results of detection of the detector 12. The judger 14 recognizes at least the other vehicle M1 running at the front side of the host vehicle 10 and the other vehicle M2 running at the rear side of the host vehicle 10. The judger 14 recognizes at least the other vehicle M3 which first merged with the first lane R1 in second lane R2 merging with the first lane R1.

The judger 14 recognizes that the host vehicle 10 and the other vehicles Mn in the surroundings of the host vehicle 10 are currently running in the first lane R1. The judger 14, for example, recognizes the position of the host vehicle 10, the relative positions of the host vehicle 10 and the other vehicles M1, M2, the speed of the host vehicle 10, the relative speeds of the other vehicles M1, M2, and other facets of the running state and recognizes the first running state of the group including the host vehicle 10 and the other vehicles M1, M2. The judger 14 recognizes the relative position, running direction, relative speed, and other facets of the running state of the other vehicle M3 running in the second lane R2 merging with the first lane R1.

The judger 14 estimates the future time (timing) and position where the other vehicle M3 will merge from the second lane R2 to the first lane R1 based on the results of recognition of the running state of the other vehicle M3. The judger 14, for example, calculates the running trajectory of the other vehicle M3 and the merging position and time of the other vehicle M3 at the merging part R based on the relative position of the other vehicle M3 with respect to the host vehicle 10, relative speed, running detection, winker operation, and other results of recognition. The judger 14 may also make the host vehicle 10 run to cooperate with the other vehicle M3 by communication with the other vehicle M3.

The judger 14 judges whether the running state of the host vehicle 10 will be changed from the first running state to the second running state in case of the other vehicle M3 merges with the group including the host vehicle 10 and the other vehicles M1, M2 at a future point of time. If, for example, learning that the other vehicle M3 will merge between the other vehicle M1 and the host vehicle 10, the judger 14 judges whether the second running state including deceleration, stopping, evasive action, etc. will occur at the host vehicle 10 for the other vehicle M3 and the host vehicle 10 to cooperatively run. If the judger 14 judges, for example, that the second running state will occur at the host vehicle 10, it makes the indicators 22 display first information relating to the predetermined reason and second information relating to the second running state of the host vehicle 10.

The first information includes alert content relating to the host vehicle 10 running in a predetermined road environment in which merging of the other vehicle M3 will occur. The second information includes alert content relating to details of the second running state of deceleration, stopping, evasive action, and other changes in behavior occurring at the host vehicle 10. If the second running state will occur in for example the host vehicle 10, the judger 14 makes the alert content be displayed through the second indicator 22B to the following other vehicle M2 expected to be affected. The judger 14, for example, makes the second indicator 22B display alert content including the first information and second information such as "RUNNING AT MERGING PART. DECELERATING FOR MAKING VEHICLE MERGE".

The judger 14 may also make the indicator Md of the other vehicle M2 display visual content including the first information and second information and make the speaker Me notify alert content including the first information and second information by communication with the other vehicle M2. The judger 14 may make the third indicator 22C and first indicator 22A which the other vehicle M3 can see visual content to the effect of the host vehicle 10 giving priority to the other vehicle M3 at the merging part R such as "DECELERATING, PLEASE MERGE" and prompt the other vehicle M3 to merge at a position in front of the host vehicle 10. The judger 14 may make the indicator Md of the other vehicle M3 display visual content to the effect of making the host vehicle 10 give priority to the other vehicle M3 at the merging part R by communication with the other vehicle M3 and make the speaker Me notify alert information to that effect.

At the host vehicle 10, in case of running at the merging part R, sometimes the second running state Mn including a wait state of waiting to give priority to other vehicles Mn will occur. If a wait state occurs, the judger 14 may make the indicators 22 display first information and second information relating to the wait state. At the host vehicle 10, in case of running at the merging part R, sometimes the second running state including priority running of running with priority over other vehicles Mn will occur. If priority running occurs, the judger 14 may make the indicators 22 display first information and second information relating to the priority running. A merging part R of the lanes is one example. The above-mentioned processing of the judger 14 may also be applied to predetermined road environments other than a merging part R where relative priority is given in running of vehicles.

According to the vehicle system 1, the judger 14 displays visual content including first information and second information at the indicators 22 and provides other vehicles Mn present in the surroundings of the host vehicle 10 with information relating to the behavior of the host vehicle 10. Due to this, it is possible to make the host vehicle 10 and other vehicles Mn run while cooperating at a merging part R of lanes and other predetermined road environments.

Figure 4:
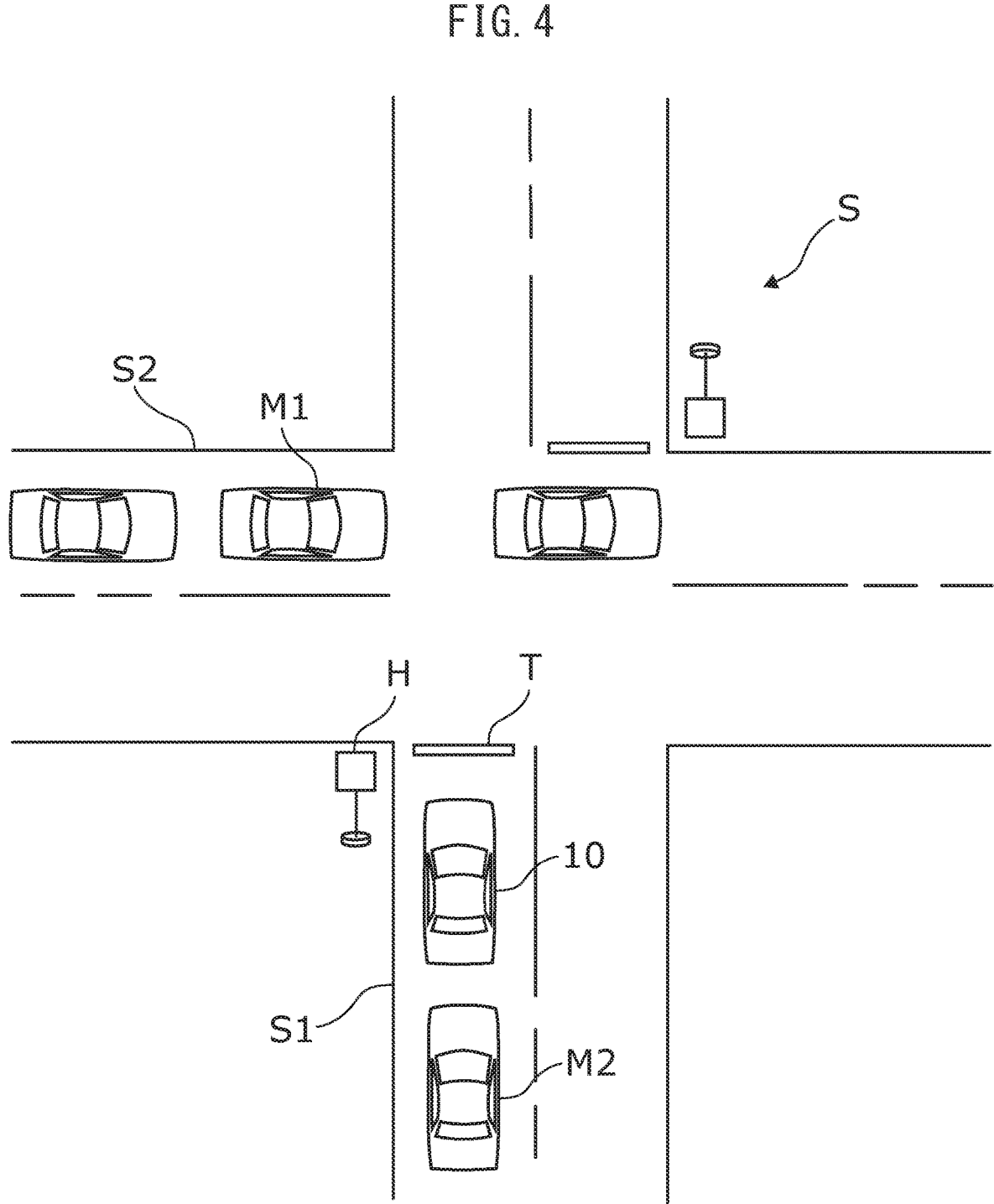
FIG. 4 is a view showing a host vehicle and other vehicles running at an intersection of a road.

FIG. 4 shows, as one example of a predetermined road environment, an intersection S where a first lane S1 and a second lane S2 cross each other with no traffic light. In the example of FIG. 4, the second lane S2 is set to a lane given priority over the first lane S. A vehicle running in the first lane S1, for example, is required by law etc. to run while giving priority to a vehicle running in the second lane S2 at the intersection S. The judger 14 judges whether a priority order arises between the other vehicles Mn and the host vehicle 10 in case of running through the intersection S.

The judger 14, for example, refers to map data stored in the storage 16 and acquires road environment map information relating to the intersection S and appended information appended to the road environment map information. The appended information includes, for example, the relative priority between the first lane S1 and second lane S2 at the intersection S and laws relating to the relative priority, relative priority of vehicles based on laws, and other information. The judger 14 judges the relative priority between the first lane S1 and second lane S2 based on the appended information.

The judger 14 may also recognize the grounds for judgment of relative priority such as the visual content at a sign H provided at the first lane S1, a stop line T, lane width, and indications provided on the lane based on the results of detection of the detector 12 to judge the relative priority between the first lane S1 and second lane S2. If the judger 14 judges that a priority order occurs between the other vehicles Mn and host vehicle 10 based on the relative priority between the first lane S1 and the second lane S2, it makes the indicators display third information relating to the reason for the priority order occurring. The judger 14, for example, recognizes that the host vehicle 10 is running in the first lane S1 and the other vehicles Mn are running in the second lane S2.

The judger 14 recognizes the relative priority between the other vehicles Mn and the host vehicle 10 based on the relative priority of the first lane S1 and the second lane S2. If the judger 14, for example, judges that a priority order occurs between the other vehicle M1 and the host vehicle 10 giving priority to the other vehicle M1, in case of the host vehicle 10 enters the intersection S, it renders the host vehicle 10 a wait state where it is made to temporarily stop and makes it give priority to the other vehicle M1 running in the second lane S2.

If making the host vehicle 10 give priority to running of the other vehicle M1, the judger 14 makes the indicators 22 display, in addition to the first information and second information, visual content including third information relating to the reason for the priority order occurring. The third information includes alert content relating to the reason why a priority order occurs between the host vehicle 10 and other vehicle M1 in case of running through the intersection S. The judger 14, for example, makes the second indicator 22B display visual content including the first information, second information, and third information such as "ENTERING INTERSECTION. STOPPING FOR ENTERING INTERSECTION TO PRIORITY ROAD. GIVING PRIORITY TO VEHICLE IN PRIORITY ROAD."

At the first lane S1, the other vehicle M2 running following after the host vehicle 10 can obtain information relating to a change in behavior of the host vehicle 10 based on visual content displayed at the second indicator 22B. The other vehicle M2 can decelerate or stop and can run at the intersection S following the host vehicle 10 based on the information relating to the host vehicle 10.

In the state where the host vehicle 10 is running in the second lane S2 and the other vehicle M1 is running in the first lane S1, if giving priority to running of the host vehicle 10 over the other vehicle M1, the judger 14 can also make the indicators 22 display visual content including, in addition to the first information and second information, third information relating to the reason why priority order is given to the host vehicle 10 over the other vehicle M1.

In a general intersection with no traffic light, like at the intersection S illustrated in FIG. 4, relative priority is not always clearly set between the first lane S1 and the second lane S2. There are also cases where the relative priority of the intersecting lanes is unclear. At such an intersection, the relative priority of the intersecting lanes is set in accordance with the law. For example, in the case where a law requiring passing on the left is applied, sometimes vehicles advancing from the left side are given priority to at intersections with no traffic lights. Further, at intersections with no traffic lights, sometimes, by law, vehicles are given priority based on the order at which they arrive at the intersections. If a priority order is given between the other vehicles M1 and the host vehicle 10, the judger 14 makes the indicators 22 display visual content including third information showing the reason why a priority order is given by law.

The other vehicle M2 can decelerate or stop and can predict the behavior of the host vehicle 10 and follow the host vehicle 10 through intersection S based on the visual content including the third information. The intersection S is one example. It may be not only a shape where the first lane S1 and the second lane S2 cross, but also a T-shaped road or other shape. The processing of the judger 14 explained above is not limited to a road and may also be applied to an entrance or exit of a building, an entrance or exit of a parking lot, or other predetermined road environments in which relative priority is given to running of vehicles.

In an intersection, merging part, or other predetermined road environment in which vehicles have to run cooperating with each other, sometimes one or more wait states will arise where the host vehicle 10 gives priority to other vehicles Mn. In a predetermined road environment in which other vehicles Mn are given priority, the host vehicle 10 is asked to yield to the other vehicles Mn. However, if the host vehicle 10 continues to yield to the other vehicles Mn, smooth traffic at the predetermined road environment is liable to be obstructed. For this reason, the host vehicle 10 preferably is kept from excessively yielding to other vehicles Mn while runs cooperating with other vehicles Mn.

If at a predetermined road environment, after a wait state occurs at the host vehicle 10 in order for the host vehicle 10 to run while giving priority to other vehicles Mn, then priority running is started in which the host vehicle 10 is given priority over the other vehicles Mn, the judger 14 makes the indicator 22 display fourth information including the number of times other vehicles Mn have been given priority and the predetermined time period required for the wait state. Thresholds are set for the predetermined number of times and the predetermined time period. If the predetermined number of times and the predetermined time period become greater than or equal to the threshold values, the judger 14 makes the fourth information be displayed at the indicators 22 and makes the host vehicle 10 run with priority over the other vehicles Mn.

The fourth information includes visual content including the reason for starting priority running in which the host vehicle 10 is given priority over the other vehicles Mn in a predetermined road environment in which the host vehicle 10 has to give priority to other vehicles Mn. The judger 14, for example, makes the display devices in the indicators 22 provided at positions which the other vehicles Mn can see display visual content including the fourth information. In case of making the host vehicle 10 start to run with priority over the other vehicles Mn, the judger 14, for example, makes the first indicator 22A display visual content including the first information, second information, and fourth information such as "ENTERING INTERSECTION. RUNNING TO ENTER INTERSECTION TO PRIORITY ROAD. YIELDED TO THREE VEHICLES IN PRIORITY ROAD. YIELD TIME 10 SECONDS".

The other vehicles Mn can learn that the host vehicle 10 will be running with priority based on the visual content including the fourth information and can decelerate or stop to run while cooperating with the host vehicle 10 and run through the intersection S following the host vehicle 10.

The judger 14 may also make the alert device 20 notify alert content emphasized over usual content if starting priority running in a predetermined road environment where the host vehicle 10 and other vehicles Mn have to run while cooperating with each other. The emphasized alert content includes visual content emphasized over the usual visual content and alert content by voice increased in volume over the usual volume. The judger 14, for example, makes the indicators 22 display visual content emphasized over the usual visual content. The "emphasized visual content", for example, is a displayed image changed in brightness or color compared with the usual displayed image, a displayed image accompanied with flashing, a displayed image made to change in flashing color, and a displayed image made to change in frequency of flashing. The judger 14, for example, makes the speaker 24 output alert content by voice increased in volume over usual alert content. The alert content increased in volume may be not only voice output based on the information but may have other sound effects added for prompting awareness.

The other vehicles Mn find it easier to confirm the host vehicle 10 will be running with priority based on the emphasized alert content and can run through the intersection S following the host vehicle 10.

Situations where the second running state occurs at the host vehicle 10 may be due not only to predetermined road environments on the road, but also may be due to the host vehicle 10. The judger 14 judges whether the second running state where the host vehicle 10 will run at a lower speed than the other vehicles Mn due to the host vehicle 10 will occur based on the results of detection by the detector 12 or the running plan of the host vehicle 10 stored in advance in the storage 16.

If the judger 14 judges that the second running state in which the host vehicle 10 runs at a lower speed than the other vehicles Mn will occur due to it, it makes the alert device 20 notify fifth information including a predetermined reason due to the host vehicle 10. The fifth information, for example, includes a state where the host vehicle 10 is carrying a fragile load, a state where young children or senior citizens are riding in it, and other predetermined reasons for running at a lower speed compared with the other vehicles Mn in the surroundings.

In case of, for example, making the host vehicle 10 run at a lower speed than the other vehicles Mn, the judger 14 makes the first indicator 22A display visual content including the second information and fifth information such as "CARRYING FRAGILE ITEMS. RUNNING AT LOW SPEED TO PROTECT LOAD". In case of making the host vehicle 10 run at a lower speed than the other vehicles Mn, the judger 14 may also make the speaker 24 notify alert content including the fifth information. By making the alert device 20 notify the fifth information, the other vehicles Mn can confirm the reason for lower speed running at the host vehicle 10 and run while passing the host vehicle 10 or taking other action.

The second running state derived from the host vehicle 10 may include not only the host vehicle 10 running at a low speed, but also a state where the host vehicle 10 stops. The judger 14 judges whether the second running state will occur accompanied with stopping due to a predetermined situation derived from the host vehicle 10 based on the results of detection by the detector 12 or the running plan of the host vehicle 10 stored in advance in the storage 16. If the judger 14 judges that the second running state accompanied with stopping will occur due to a predetermined reason derived from the host vehicle 10, it makes the alert device 20 notify sixth information including the predetermined reason derived from the host vehicle 10.

The sixth information includes, for example, a state where something has occurred obstructing running in the host vehicle 10 itself, a state where there is an obstacle obstructing running of the host vehicle 10 present on the road, a state awaiting assistance, or other predetermined reason for the host vehicle 10 stopping. The judger 14, for example, make the first indicator 22A display visual content including the second information and sixth information such as "STOPPING DUE TO ABNORMALITY IN VEHICLE" in the state making the host vehicle 10 stop. The judger 14 may also make the speaker 24 notify alert content including the sixth information in a state where the host vehicle 10 is made to stop. By making the alert device 20 notify the sixth information, the other vehicles Mn can confirm the reason for the host vehicle 10 to be stopping and take measures such as running while avoiding the host vehicle 10.

The second running state derived from the host vehicle 10 may include not only running at a lower speed or stopping, but may include even the state of running at a higher speed than other vehicles within the scope of the law. The judger 14 judges whether the second running state in which the host vehicle 10 will run at a higher speed than the other vehicles due to a predetermined situation derived from the host vehicle 10 will occur based on the results of detection by the detector 12 or the running plan of the host vehicle 10 stored in advance in the storage 16.

If judging that a second running state in which the host vehicle 10 is running at a higher speed than the other vehicles will arise due to a predetermined circumstance derived from the host vehicle 10, the judger 14 may make the alert device 20 notify seventh information including the predetermined reason derived from the host vehicle 10. The seventh information includes, for example, a state where an emergency state arises such as a need to secure medical assistance for a passenger of the host vehicle 10, a state where the charge of the electric power source of the host vehicle 10 falls and charging becomes urgently necessary, and other predetermined reasons for running at a higher speed than other vehicles. By making the alert device 20 notify the seventh information, the other vehicles Mn can confirm the reason for the host vehicle 10 to be running at a high speed and take measures such as giving priority to the host vehicle 10 in running.

The alert device 20 need not necessarily be made to always operate. In automated driving areas where operation of manual driving vehicles is restricted and automated driving vehicles run in cooperation with each other, the vehicles may acquire information by vehicle-to-vehicle communication. The alert device 20 need not be operated. However, in a specific area in which automated driving vehicles and manual driving vehicles run mixed together and the drivers are held responsible for driving, the alert device 20 preferably is operated.

The judger 14 judges whether the host vehicle 10 is running in a predetermined area in which manual driving vehicles operated by drivers and automated driving vehicles able to automatically run can run mixed together based on the results of detection by the detector 12 and the running plan of the host vehicle 10 and map information stored in advance in the storage 16. "Manually driven vehicles" may also include automated driving vehicles running at an automated driving level in which the driver is held responsible for driving. The judger 14 may also acquire the running plan and map information from the server apparatus 40 through the network W. The judger 14 makes the alert device 20 operate if judging that the host vehicle 10 is running in a predetermined area. By selecting the operating state of the alert device 20, the power consumption of the host vehicle 10 can be reduced.

In a predetermined area in which manual driving vehicles and automated driving vehicles can run mixed together, the drivers of manual driving vehicles are held responsible for driving, so preferably the alert device 20 is operated. In the predetermined area, the alert device 20 does not have to be constantly operated. It is preferably operated in case of other vehicles being alerted are manual driving vehicles operated by drivers. The judger 14 judges whether other vehicles being alerted by the alert device 20 are manual driving vehicles operated by drivers based on, for example, vehicle-to-vehicle communication with other vehicles Mn running in the surroundings of the host vehicle 10. The judger 14 judges the automated driving levels of the other vehicles Mn based on vehicle-to-vehicle communication with the other vehicles Mn.

The judger 14 judges that the other vehicles Mn are manual driving vehicles if the automated driving levels of the other vehicles Mn are less than or equal to a predetermined level. The judger 14 also judges that the other vehicles Mn are manual driving vehicles if vehicle-to-vehicle communication with the other vehicles Mn is disabled. The judger 14 selects the other vehicles Mn to be alerted from among the other vehicles Mn found to be manual driving vehicles. The judger 14 makes the alert device 20 operate if judging that the other vehicles Mn to be alerted by the alert device 20 are manual driving vehicles operated by the drivers. By selecting the operating state of the alert device 20 in accordance with the automated driving levels of the other vehicles Mn to be alerted, the power consumption of the host vehicle 10 can be reduced.

Figure 5:
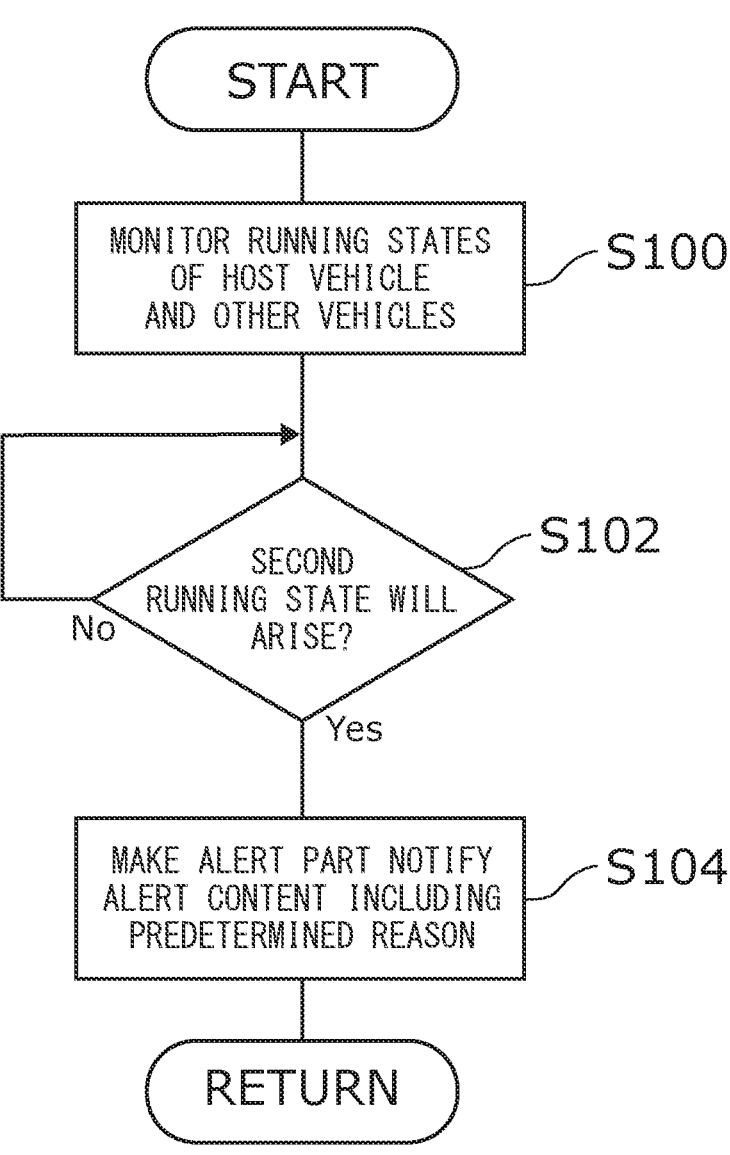
FIG. 5 is a flow chart showing the flow of processing of a vehicle control method performed in a vehicle system.

FIG. 5 shows the flow of a vehicle control method performed at the vehicle system 1. The vehicle control method is performed by a computer program installed at different components of the vehicle system 1. Based on the results of detection of the detector 12, the judger 14 monitors the running states of the host vehicle 10 and other vehicles Mn present in the surroundings of the host vehicle 10 (step S100). The judger 14 judges whether the second running state in which the behavior of the host vehicle 10 will change compared with the first running state in which the host vehicle 10 or other vehicles Mn are currently running will arise due to a predetermined reason (step S102). If judging that a second running state will occur, the judger 14 makes the alert device 20 which notifies information relating to the host vehicle 10 to the outside notify alert content including the predetermined reason (step S104).

In the above-mentioned processing operations, if the judger 14 judges that the second running state will occur and makes the alert device 20 operate, it is also possible to make data of the results of judgment, including the behavior of the host vehicle 10 in the second running state and the reason for occurrence of the second running state, be stored in the storage and to construct a system log. The judger 14 stores the visual content displayed at the indicators 22 and data of the first information to the seventh information corresponding to the visual content, the time of occurrence, position of occurrence, predetermined road environment, and other data at the storage 16. By constructing a system log in case of the alert device 20 is operating, it is possible to verify the relationship between the past running state of the host vehicle 10 and the operating state with the alert device 20.

In the above-mentioned explanation and drawings, the vehicle system 1 is illustrated for the case where traffic laws relating to vehicles passing on the left side are applied. The vehicle system 1 can however be applied to not only traffic laws relating to vehicles passing on the left side, but also traffic laws relating to vehicles passing on the right side. If traffic laws relating to vehicles passing on the right side are applied, the vehicle system 1, in the above explanation and drawings, the left and right may be considered switched. In the vehicle system 1, the judger 14 may be provided not only at the host vehicle 10, but also the server apparatus 40 side. In this case, the judger 14 may acquire information relating to running of the host vehicle 10 through the network W to judge the running state of the host vehicle 10 and make the alert device 20 notify that alert content based on the results of judgment.

In the above-mentioned embodiment, the computer program run at the components of the vehicle system 1 may be provided in a form recorded in a portable recording medium (non-transitory storage medium) such as a semiconductor memory, magnetic recording medium, or optical recording medium.

The invention claimed is:

1. A vehicle system comprising:
   a processor configured to judge a running state of a host vehicle,
   wherein when the processor judges that a second running state in which the host vehicle will change in behavior compared with a first running state in which the host vehicle or other vehicles present in the surroundings of the host vehicle are currently running will occur due to a predetermined reason, the processor alerts an outside of the alert content including the predetermined reason, and
   wherein when the processor judges that the host vehicle is running in a predetermined area in which manual driving vehicles operated by drivers and automated driving vehicles able to automatically run can run mixed together, the processor notifies that alert content to the outside.

2. The vehicle system according to claim 1,
wherein the processor displays to the outside a content including first information relating to the predetermined reason.

3. The vehicle system according to claim 2,
wherein when the processor judges that the second running state will occur in order for the other vehicles and the host vehicle to run in cooperation in a predetermined road environment in which the host vehicle and the other vehicles run, the processor displays to the outside the alert content including the first information and second information relating to the second running state.

4. The vehicle system according to claim 3,
wherein when the processor judges that the host vehicle running in a predetermined road environment, and the second running state including a wait state of the host vehicle waiting in order to give priority to the other vehicles will occur, or priority running in which the host vehicle runs given priority over the other vehicles will occur, the processor displays to the outside the alert content including the first information and the second information relating to the wait state or priority running.

5. The vehicle system according to claim 4,
wherein when the processor judges that starting priority running after the wait state has occurred at the host vehicle in the predetermined road environment, the processor displays to the outside fourth information including a predetermined number of times giving priority to other vehicles and a predetermined time period required for the wait state.

6. The vehicle system according to claim 5,
wherein when the processor judges that starting the priority running in the predetermined road environment, the processor displays to the outside the visual content emphasized over the usual visual content and outputs to the outside by voice the alert content emphasized over the usual alert content.

7. The vehicle system according to claim 3,
wherein when the processor judges that the host vehicle running in the predetermined road environment, and a priority order will arise between the other vehicles and the host vehicle, the processor displays to the outside the alert content including third information relating to the reason for occurrence of the priority order.

8. The vehicle system according to claim 1,
wherein when the processor judges that the second running state in which the host vehicle will run by a lower speed than the other vehicles will arise due to that host vehicle, the processor alerts fifth information including the predetermined reason derived from the host vehicle to the outside.

9. The vehicle system according to claim 1,
wherein when the processor judges that the second running state accompanied with stopping will arise due to the host vehicle, the processor alerts sixth information including the predetermined reason derived from the host vehicle to the outside.

10. The vehicle system according to claim 1, wherein when the processor judges that another vehicle to be alerted at the outside in that predetermined area is a manual driving vehicle operated by a driver, the processor notifies that alert content to the outside.

11. The vehicle system according to claim 1, wherein when the processor judges that the second running state has occurred and notifying that alert content, the processor stores data on the results of judgment including the behavior of the host vehicle in the second running state and the reason for occurrence of the second running state.

12. A vehicle control method operated by a computer, comprising:

monitoring running states of a host vehicle and other vehicles present in the surroundings of the host vehicle, judging if a second running state in which the host vehicle will change in behavior compared with a first running state in which the host vehicle or the other vehicles are currently running will occur based on a predetermined reason, notifying alert content including the predetermined reason to an outside if judging that the second running state will arise, and notifying alert content to the outside if judging that the host vehicle is running in a predetermined area in which manual driving vehicles operated by drivers and automated driving vehicles able to automatically run can run mixed together will arise.

* * * * *